Nov. 6, 1956  G. C. FURLONG  2,769,602
AIRPLANE WING WITH STABILIZING LEADING-EDGE
CHORD-EXTENSIONS
Filed July 24, 1952

Inventor
GEORGE C. FURLONG

By
J. Schmitt
Walter S. Paul
Attorneys

United States Patent Office 2,769,602
Patented Nov. 6, 1956

2,769,602

AIRPLANE WING WITH STABILIZING LEADING-EDGE CHORD-EXTENSIONS

George Chester Furlong, Newport News, Va.

Application July 24, 1952, Serial No. 300,791

9 Claims. (Cl. 244—40)

(Granted under Title 35, U. S. Code (1952), sec. 266)

The invention described herein may be manufactured and used by or for the Government of the United States of America for governmental purposes without the payment of any royalties thereon or therefor.

This invention relates to devices for improving the behavior of wings, especially swept back wings.

An object of this invention is to provide means for obtaining uniform longitudinal stability of a wing through the entire lift range with swept back wings that exhibit a vortex flow type of separation. The aforementioned type of flow separation produces large, undesirable shifts in aerodynamic center well below maximum lift and seriously hampers the usefulness of swept wing plan form configurations which exhibit it.

Several devices, such as extensible leading edge flaps, leading edge slats, and droop nose flaps, are presently employed as stall control devices on swept wings, and they have been used with some degree of success in controlling the stability variations obtained in the low and moderate lift ranges when the vortex flow is present. As the name of these devices—stall control devices—implies, they are intended for use in the high lift range to obtain a stable pitching moment break at the stall. However, there are disadvantages in the use of these devices, and they fall in two catagories, namely, aerodynamic and structural. Aerodynamically, the extensible leading edge flaps, for example, produce an increase in drag in the low and moderate lift ranges, which necessarily reduces the lift to drag ratios obtained. Structurally, leading edge flaps are cumbersome and weighty and as a result have never been constructed on aircraft in production, and have served merely as a wind tunnel tool. Extended leading edge slats, which exhibit similar aerodynamic characteristics, have been applied to aircraft in construction; but the installation of such a device requires a great addition in weight to provide for a retracting and deflecting mechanism. Hence, it is another object of the invention to provide a stability enhancing device as aforementioned, which is mechanically simple and practical, adding very little to the gross weight of an aircraft on which the device is used, and yet serve to obtain the above-mentioned uniform longitudinal stability.

A further object of the invention is to provide means for effecting a discontinuity in wing plan form which is capable of diffusing the vortex flow common to swept wings employing sharp nose airfoils and moderately to highly swept wings employing thin subsonic airfoils. By such diffusion control, the large aerodynamic center shifts due to the presence of the vortex flow are eliminated. The diffusion of the vortex flow can be accomplished without any increase in drag through the lift range.

The principle involved herein is markedly different from that previously used in applying known leading edge devices, the latter operating on the theory of improving the flow and hence keeping the affected sections of the wing from stalling until other portions of the wing have stalled. The present invention operates on the principle of diffusing the vortex flow rather than that of simply improving the flow.

Other objects and features of importance will become apparent in following the description of the illustrated forms of the invention.

Figure 1:
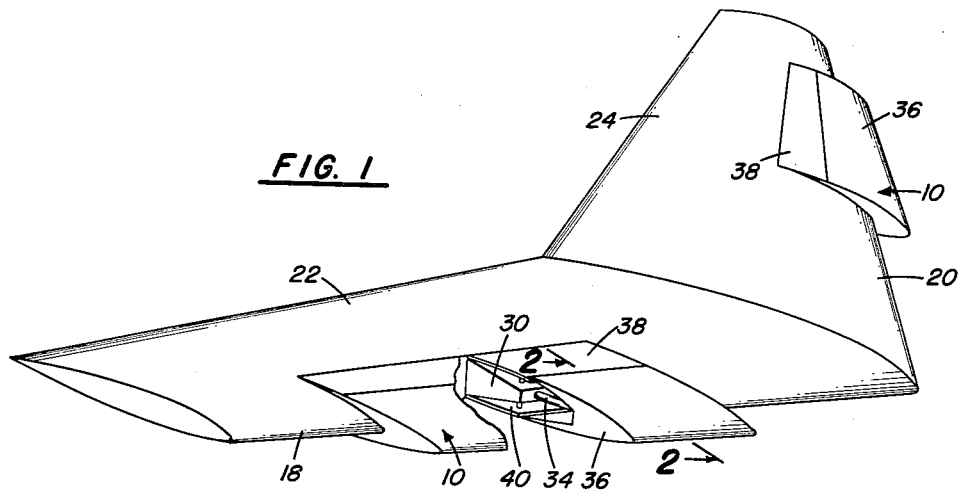
Fig. 1 is a perspective view of a wing with parts broken away to show some detail of the leading edge chord extension.
Figure 3:
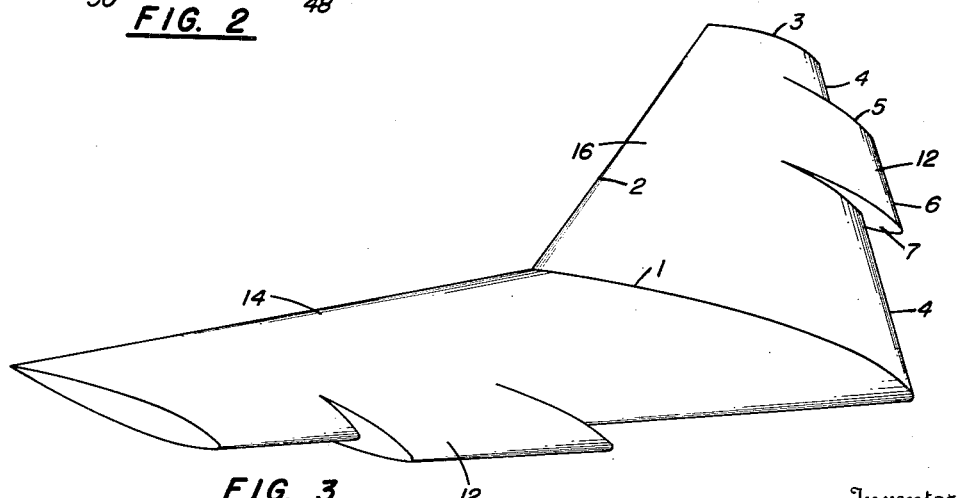
Fig. 3 is a perspective view of another embodiment of the invention.

Two embodiments capable of attaining the specifically mentioned and other related objects of the invention, are disclosed in Figs. 1 and 3, showing wings, each semispan of which having in plan form seven edges 1, 2, 3, 4, 5, 6 and 7, respectively. The structural nature of these embodiments is simplified, that is, chord extensions 10 are provided in Fig. 1, while wing chord extensions 12 are provided on wings 14 and 16 of Fig. 3. The configurations of the extensions are substantially the same, the distinguishing feature of embodiments being that extensions 12 are fixed while extensions 10 are capable of motion in a linear path toward and outwardly of the swept leading edges 18 and 20 of the wings 22 and 24. The leading edges of the extensions should have the same or substantially the same shape as the wing leading edges.

Wings which are swept back considerably, as shown in the drawing, exhibit a vortex flow type of separation producing large, undesirable shifts in aerodynamic center well below maximum lift of the wing. This seriously hampers the usefulness of such swept wing plan form because the necessary stability throughout the lift range is unavailable. To overcome this, the extensions 10 and 12 have been provided at the leading edges of the wings, the extensions projecting chordwise of the wings and forwardly of the leading edges thereof. Extensions 10 and 12 reorient the vortex flow causing it to be diffused. It has been found that such extensions on swept wings cause the wings to have only a small stability change through the entire lift range. In one of a number of tested cases, selected by way of example only, where the swept angle was 52°, the stability changes amounted to only an 8 percent shift in aerodynamic center between zero and maximum lift. The low speed drag of the local chord extension (either 10 or 12) has been found to be negligible in the tested case mentioned above. The ability of the chord extensions to provide acceptable stability variations through the entire lift range lies in the fact that the plan form discontinuity determines the location of the initial separation and prevents the increase in lift-curve slope over the tip sections of the swept wing on which they are applied.

Figure 2:
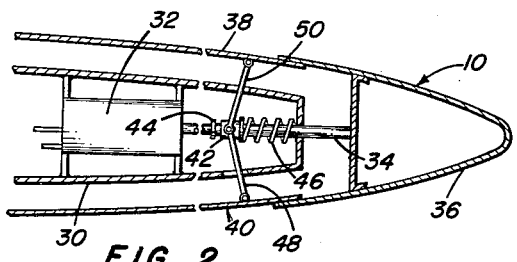
Fig. 2 is an enlarged sectional view taken on the line 2—2 of Fig. 1 and in the direction of the arrows.

In Figs. 1 and 2, the extensions are shown to be extensible in a straight-line motion fore and aft of the wings so that the degree of change in wing plan form may be selected for optimum flight conditions. Although various types of motors and motor assemblies may be used to actuate the extensions 10, since they move only in a linear path, the extension moving means may be simply constructed. A support 30 is provided between the upper and lower surfaces of the wing, and contains a fluid motor 32 having a piston rod 34 to which the nose portion 36 of extension 10 is fixed. Two or more motors 32 are used for each extension 10 whereby the extension is supported by the piston rods thereof. Upper and lower contour flaps 38 and 40 respectively are hinged to a suitable part of the wing structure and are arranged to form smooth forward continuations of the wing surfaces in any position of adjustment of the extensions 10, since they have their forward edges fitted under the top and bottom surface of nose portion 36.

The contour flaps prevent flow behavior as would be found with wing slots or forwardly extending slats because the space between the nose portion and the place where the leading edge would be located in the case of a conventional wing, is closed by the flaps 38 and 40. Spring means are used to actuate the flaps 38 and 40. As the piston rod 34 is extended the collar 42 on rod 34 slides freely until contacted by the stop 44 on the piston rod. Then the collar 42 is moved forward against the opposition of spring 46, thereby urging the contour flaps 38 and 40 outwardly through the action of links 48 and 50 that are pivoted to the collar 42 and the flaps 38 and 40. When the motor 32 is retracting the extension 10, the spring 46 returns the collar 42 thereby allowing the links 48 and 50 to pull the flaps 38 and 40 toward the support 30 so that the inner edges of the nose portion 36 ride over the forward edges of the contour flaps 38 and 40.

It is understood that various modifications may be made without departing from the scope of the following claims.

What is claimed is:

1. A wing having upper and lower surfaces together with a trailing and a leading edge, the wing being of swept formation which in flight exhibits a vortex type of flow separation producing large shifts in aerodynamic center well below maximum lift, and means connected with the wing for diffusing said vortex flow thereby preventing the large shifts in aerodynamic center, including a continuous partial span leading edge extension projecting forwardly of said leading edge and constituting a chordwise extension of the wing, said extension being located spanwise intermediate the root and tip of the wing.

2. The wing of claim 1 wherein the leading edge extension is spaced from the wing tip and root.

3. A wing having upper and lower surfaces together with a trailing and a leading edge, the wing being of swept formation which in flight exhibits a vortex type of flow separation producing large shifts in aerodynamic center well below maximum lift, and means connected with the wing for diffusing said vortex flow thereby preventing the large shifts in aerodynamic center, including a partial span leading edge extension projecting forwardly of said leading edge and constituting a chordwise extension of the wing, said extension being located spanwise intermediate the root and tip of the wing, means mounted in said wing for moving said extension in a chordwise direction with respect to the wing, and means operatively connected with said moving means for continuing the contour of said upper and lower wing surfaces to the aft end of said extension when the extension is projected outwardly of the leading edge.

4. A wing having upper and lower surfaces together with a trailing and a leading edge, the wing being of swept formation which in flight exhibits a vortex type of flow separation producing large shifts in aerodynamic center well below maximum lift, and means connected with the wing for diffusing said vortex flow thereby preventing the large shifts in aerodynamic center, including a partial span leading edge extension projecting forwardly of said leading edge and constituting a chordwise extension of the wing, said extension being located spanwise intermediate the root and tip of the wing, means connected to said extension for moving said extension in a chordwise direction of said wing, and upper and lower contour flaps forming a smooth forward continuation of the wing to the aft end of said extension.

5. The wing of claim 4 and; said flaps being displaceably carried by said wing, and means operatively connected with the flaps for displacing said flaps in response to a predetermined movement of said extension moving means.

6. A wing having a swept back leading edge and exhibiting a vortex flow type of separation producing shifts in aerodynamic center below maximum lift thereby causing longitudinal instability, means for obtaining uniform longitudinal stability through the entire lift range of the wing by diffusing the vortex flow thereby preventing said shifts in aerodynamic center to obtain uniform longitudinal stability, said means comprising a partial span chordwise continuous extension of the wing leading edge, said extension having a leading edge of a configuration congruous with the configuration of the first-mentioned leading edge, and said extension being located spanwise intermediate the tip and root of said wing.

7. A wing having a swept back leading edge and exhibiting a vortex flow type of separation producing shifts in aerodynamic center below maximum lift thereby causing longitudinal instability, means for obtaining uniform longitudinal stability through the entire lift range of the wing by diffusing the vortex flow thereby preventing said shifts in aerodynamic center to obtain uniform longitudinal stability, said means comprising a partial span chordwise continuous extension of the wing having a leading edge of a configuration congruous with the configuration of the first-mentioned leading edge, and means operatively connected with said extension for supporting and moving said extension in a linear path toward and outwardly of said swept back leading edge.

8. A swept wing having a semi-span plan form defined by a tip, root edge, trailing edge and a rearwardly slanted leading edge, wherein there is longitudinal instability at various portions of the lift range due to excessive aerodynamic center shift, means for preventing said excessive shift of aerodynamic center to provide longitudinal stability, said means comprising an extension for said wing having a leading edge and sides which vary the plan form thereof, the extension projecting forwardly of said semi-span leading edge and chordwise of the wing, and said extension with the surfaces of said wing forming a plan form configuration with at least seven edges when the perimeter of the plan form configuration is an unbroken line.

9. A swept wing having a semi-span plan form defined by a tip, root edge, trailing edge and a rearwardly slanted leading edge, wherein there is longitudinal instability at various portions of the lift range due to excessive aerodynamic center shift, means for preventing said excessive shift of aerodynamic center to provide longitudinal stability, said means comprising a chordwise extension of the wing to diffuse the flow over the wing, and said extension having a leading edge with continuous means merging said extension leading edge with the surfaces of the wing.

References Cited in the file of this patent

UNITED STATES PATENTS

| | | |
|---|---|---|
| 2,070,705 | Barnhart | Feb. 16, 1937 |
| 2,120,568 | Nazir | June 14, 1938 |
| 2,323,542 | Jacobs | July 6, 1943 |
| 2,357,680 | Molloy | Sept. 5, 1944 |
| 2,358,985 | McAndrew | Sept. 26, 1944 |
| 2,549,045 | Askenas | Apr. 17, 1951 |

FOREIGN PATENTS

| | | |
|---|---|---|
| 724,312 | Germany | Aug. 22, 1942 |

OTHER REFERENCES

N. A. C. A. Technical Note No. 1093, July, 1946 (page 6 and Fig. 39).

Pelessoni published by A. P. C. Serial No. 358,731, May 25, 1943.